(12) United States Patent
Prasad et al.

(10) Patent No.: US 6,296,686 B1
(45) Date of Patent: *Oct. 2, 2001

(54) CERAMIC MEMBRANE FOR ENDOTHERMIC REACTIONS

(75) Inventors: Ravi Prasad, East Amherst; Christian Friedrich Gottzmann, Clarence, both of NY (US)

(73) Assignee: Praxair Technology, Inc., Danbury, CT (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/143,974

(22) Filed: Aug. 31, 1998

Related U.S. Application Data

(63) Continuation-in-part of application No. 09/089,372, filed on Jun. 3, 1998, now Pat. No. 6,139,810.

(51) Int. Cl.[7] .................................................. B01D 53/22
(52) U.S. Cl. ............................................. 95/51; 95/45
(58) Field of Search ........................... 204/419; 205/633, 205/634, 635, 637, 625; 95/45, 51

(56) References Cited

U.S. PATENT DOCUMENTS

| | | | |
|---|---|---|---|
| 4,791,079 | 12/1988 | Hazbun | 502/4 |
| 4,793,904 | 12/1988 | Mazanec et al. | 204/59 |
| 5,108,465 | 4/1992 | Bauer et al. | 55/16 |
| 5,306,411 | 4/1994 | Mazanec et al. | 204/265 |
| 5,356,728 | 10/1994 | Balachandran et al. | 429/8 |
| 5,565,009 * | 10/1996 | Ruhl et al. | 48/197 R |
| 5,567,398 | 10/1996 | Ruhl et al. | 422/197 |
| 5,599,383 | 2/1997 | Dyer et al. | 96/8 |
| 5,618,332 * | 4/1997 | Ekiner | 95/51 |
| 5,681,373 | 10/1997 | Taylor et al. | 96/11 |
| 5,750,279 | 5/1998 | Carolan et al. | 429/32 |
| 6,010,614 * | 1/2000 | Keskar | 205/765 |
| 6,048,472 * | 4/2000 | Nataraj | 252/373 |
| 6,153,163 * | 11/2000 | Prasad et al. | 423/246 |
| 6,214,066 * | 4/2001 | Nataraj et al. | 95/54 |

* cited by examiner

*Primary Examiner*—K. Mayekar
(74) *Attorney, Agent, or Firm*—David M. Rosenblum

(57) ABSTRACT

Syngas, a mixture of hydrogen and carbon monoxide, is an intermediate in the conversion of methane to liquid fuels. For certain applications, it is desirable to maintain an $H_2/CO$ molar ratio of about 3. This molar ratio is achieved by steam reforming of methane in accordance with:

$$CH_4 + H_2O \rightarrow 3H_2 + CO.$$

To provide the heat required to drive the endothermic steam reforming reaction, a low grade fuel is combusted in a reactor and the heat of combustion conducted to the endothermic reaction. By using an oxygen selective ion transport membrane element to transport the oxygen required for combustion, the formation of undesirable NOx compounds is minimized.

8 Claims, 6 Drawing Sheets

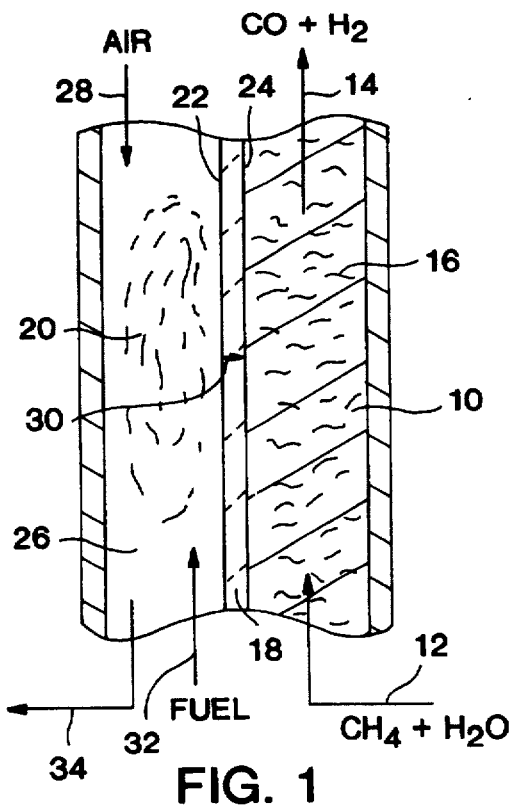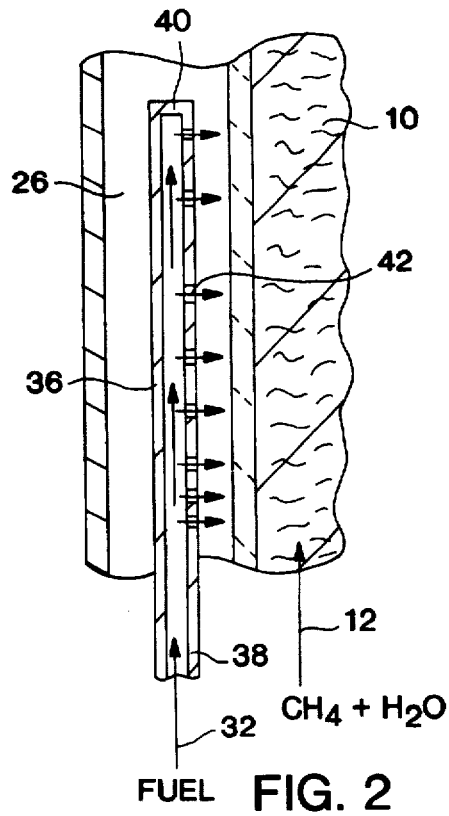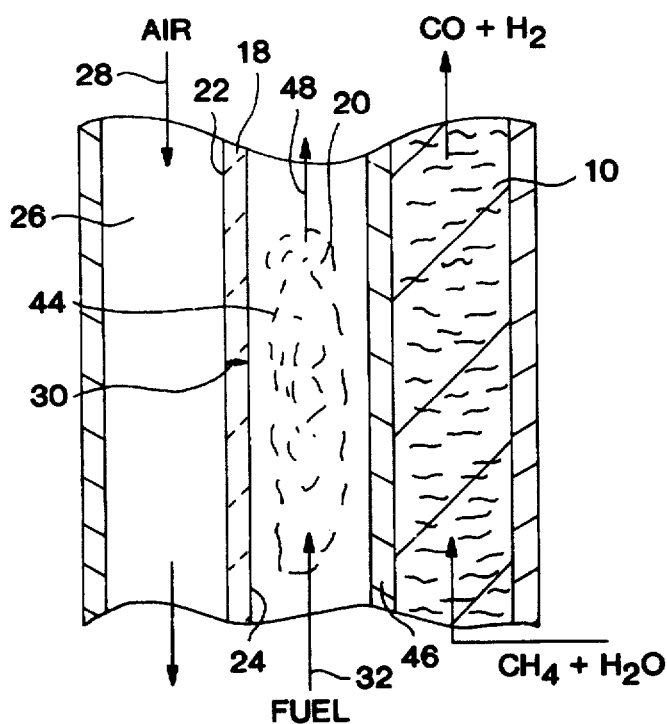

CERAMIC MEMBRANE FOR ENDOTHERMIC REACTIONS

CROSS REFERENCE TO RELATED APPLICATION

This patent application is a continuation-in-part of U.S. patent application Ser. No. 09/089,372 that was filed on Jun. 3, 1998, now U.S. Pat. No. 6,139,810, and is incorporated by reference in its entirety herein.

FIELD OF THE INVENTION

The invention relates to a process for producing a product gas, such as syngas or an unsaturated hydrocarbon, in a reactor through an endothermic steam reforming reaction. The heat energy to sustain the endothermic reaction is generated by combusting a fuel with oxygen obtained from either the permeate or the retentate portion of an oxygen-containing gas following gas separation by contact with an oxygen-selective ion transport membrane.

BACKGROUND OF THE INVENTION

Natural gas and methane, a major constituent of natural gas, are difficult to economically transport and are not easily converted into liquid fuels or chemicals, such as gasoline, methanol, formaldehyde and olefins, that are more readily contained and transported. To facilitate transport, methane is typically converted to synthesis gas (syngas) which is an intermediate in the conversion of methane to liquid fuels, methanol or other chemicals. Syngas is a mixture of hydrogen and carbon monoxide with an $H_2/CO$ molar ratio of from about 0.6 to about 6.

One chemical reaction effective to convert methane to syngas is steam reforming. Methane is reacted with steam and endothermically converted to a mixture of hydrogen and carbon monoxide. The heat energy to sustain the endothermic reaction is generated by the external combustion of fuel. The steam reforming reaction is of the form:

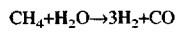

$$CH_4 + H_2O \rightarrow 3H_2 + CO$$

and produces syngas at an $H_2/CO$ molar ratio of 3.

A second chemical reaction effective to convert methane to syngas is partial oxidation. Methane is reacted with oxygen in an exothermic reaction of the form:

$$CH_4 + \tfrac{1}{2}O_2 \rightarrow 2H_2 + CO. \qquad (2)$$

and produces syngas at an $H_2/CO$ molar ratio of 2.

U.S. Pat. No. 5,306,411 to Mazanec, et al., that is incorporated by reference in its entirety herein, discloses the production of syngas by combined partial oxidation and steam reforming. The syngas is then converted to liquids by the Fischer-Tropsch process or can be converted to methanol by commercial processes.

In accordance with the Mazanec et al. patent, oxygen for an anode side reaction is obtained by contacting an oxygen-containing gas, preferably air, with the cathode side of a mixed conductor oxygen-selective ion transport membrane element and permeating oxygen by ion transport to the anode side of the mixed conductor. The membrane element has infinite oxygen selectivity. "Oxygen selectivity" is intended to convey that oxygen ions are preferentially transported across the membrane over other elements, and ions thereof. The membrane element is made from an inorganic oxide, typified by calcium- or yttrium-stabilized zirconia or analogous oxides having a fluorite or perovskite structure.

At elevated temperatures, generally in excess of 400° C., the membrane element contains mobile oxygen ion vacancies that provide conduction sites for the selective transport of oxygen ions through the membrane elements. The transport through the membrane elements is driven by the ratio of partial pressure of oxygen ($P_{o2}$) across the membrane: O–ions flow from the side with high $P_{o2}$ to the side with low $P_{o2}$.

Ionization of $o_2$ to $O^-$ takes place at the cathode side of the membrane element and the ions are then transported across the membrane element. The $O^-$ ions then either combine to form oxygen molecules or react with a fuel, in either instance releasing $e^-$ electrons. Membrane elements that exhibit only ionic conductivity include external electrodes located on the surfaces of the membrane element. The electron current is returned to the cathode by an external circuit. Membrane elements having both ionic conductivity and electron conductivity transport electrons back to the cathode side internally, thus completing a circuit and obviating the need for external electrodes.

Commonly owned U.S. patent application Ser. No. 09/089,372 discloses the production of a product gas, typified by syngas, utilizing an oxygen selective ion transport membrane element to provide oxygen for combined endothermic and exothermic reactions where the overall reaction is exothermic or energy neutral. At least one of the endothermic reaction, the exothermic reaction and the internal heat transfer within the reactor is controlled to maintain the oxygen selective ion transport membrane within prescribed thermal limits since the membrane material will degrade at temperatures above about 1100° C.

The ion transport membrane enables the local transfer of oxygen into the reaction passage to sustain the partial oxidation reaction without contaminating the reaction products with nitrogen. The balance between the reforming and partial oxidation reactions will depend on relative reaction kinetics which are influenced by the process feed composition, catalyst activity and the amount of oxygen transferred. The reactions typically are conducted at a temperature from 400° C. to 1200° C. and preferably between 800° C. and 1050° C. Since the partial oxidation reaction is exothermic and the reforming reaction endothermic, the balance between the two will determine whether the overall process is exothermic or endothermic. Depending on the operating pressure the process is energy neutral at $H_2/CO$ molar ratios in the range of 2.3 to 2.5, produces excess energy below that range and requires additional heat above the range.

In accordance with the Ser. No. 09/089,372 patent application, the heat generated by the exothermic partial oxidation reaction is sufficient to satisfy the requirements of the endothermic reaction and, preferably, generates a heat surplus to compensate for thermal losses.

When the exothermic reaction is partial oxidation of methane, the reaction generates two moles of hydrogen for every mole of carbon monoxide produced. When the endothermic reaction is steam reforming, the reaction generates three moles of hydrogen for every mole of carbon monoxide produced.

The process and reactor designs disclosed in the Ser. No. 09/089,372 application are particularly suited for generating syngas with $H_2/CO$ molar ratios in the range of 2.3 to 2.5, dependent on reactor pressure.

For certain chemical processes, it is desirable to have syngas with an $H_2/CO$ molar ratio greater than about 2.3. To shift the $H_2/CO$ ratio to greater than 2.3 to 2.5, it is possible to generate additional heat by driving the partial oxidation reaction towards more complete oxidation. This approach also generates more $H_2O$ and more $CO_2$ that must be removed from the product gas at some expense. In addition, the additional fuel burned during oxidation is high grade, and therefore expensive, natural gas.

A second approach is to provide externally generated heat to the reactor. This approach is also less than satisfactory because of the associated cost.

U.S. Pat. Nos. 5,565,009 and 5,567,398 to Ruhl, et al., that are incorporated by reference in their entireties herein, disclose manufacturing syngas by steam reforming of methane in a catalyst bed located on the shell side of a tube and shell reactor. The heat for sustaining the reforming reaction is provided by combustion of fuel within tubes where the fuel and oxygen supply (air) are separately heated and only combined after they reach their auto-ignition temperature. The oxygen is provided by air and the nitrogen contained within that air is heated during combustion to form a number of detrimental NOx compounds that can only be removed from the combustion products gas with difficulty.

U.S. patent application Ser. No. 08/848,204 entitled "Solid Electrolyte Ion Conductor Reactor Design" by Gottzmann, et al., that was filed on Apr. 29, 1997, now U.S. Pat. No. 5,820,655 and it is incorporated by reference in its entirety herein, discloses using the heat generated by an exothermic oxidation reaction to heat an oxygen-containing feed gas prior to delivery of that feed gas to the cathode side of an oxygen-selective ion transport membrane element. The Ser. No. 08/848,204 application also discloses the use of a thermally conductive shroud tube surrounding the membrane elements to enhance the transfer of heat while maintaining isolation of gases.

While the aforementioned disclosures recite processes and reactors for the production of syngas utilizing an oxygen-selective ion transport membrane element and utilizing the heat generated by an exothermic partial oxidation reaction to drive an endothermic steam reforming reaction, they are generally limited to the production of syngas with $H_2/CO$ molar ratios of from 2.3 to 2.5, depending on reaction side pressure, and where the heat released by the exothermic partial oxidation reaction is equal to or greater than the heat required for the endothermic reforming reaction. Higher molar ratios are obtainable by providing additional heat to drive the steam reforming reaction, but this approach requires the addition of externally generated heat, at a significant expense, and is typically associated with the formation of undesirable NOx compounds.

There remains, therefore, a need for a method to generate syngas having $H_2/CO$ molar ratios higher than 2.3 to 2.5 that does not have the limitations of the prior art.

OBJECTS OF THE INVENTION

It is therefore an object of the invention to provide a process for the production of syngas having $H_2/CO$ molar ratios the generation of which requires more heat than is available from the balance of exothermic and endothermic reactions.

It is another object of the invention to provide processes and reactor designs where all or at least a portion of a heat generating oxidation reaction excludes nitrogen from the reaction environment by the use of ion transport membranes that are exclusively selective for oxygen, thereby minimizing NOx formation.

Yet another object of the invention is to provide a combustion reaction in a syngas reactor at a location effective for transfer of heat to an adjacent endothermic reaction. The oxygen for the combustion reaction is provided by contacting an oxygen containing gas, typically air, with an oxygen-selective ion transport membrane and then reacting either a permeate portion of the oxygen or a retentate portion of the oxygen with a fuel to generate heat for the endothermic reaction.

Still another object of the invention is to utilize a fuel having a relatively low heating value for the combustion reaction. Typically, the heating value of this fuel is less than 500 $BTU/FT^3$, considerably less than that of natural gas that typically has a heating value in excess of 900 $BTU/FT^3$. This enables the use of inexpensive flare gases (the waste product burned in a flare at refineries and other chemical plants) or pressure swing adsorption (PSA) tail gases. Utilization of these low heat value fuels, that were previously viewed as waste streams, provides a significant cost advantage.

A still further object of the invention is to include, if required by the desired $H_2/CO$ ratio, a partial oxidation reaction that provides portions of the syngas product and of the heat to enable the endothermic partial oxidation reaction to proceed.

Yet another object of the invention is to provide syngas reactor designs effective to achieve the process objectives stated above.

SUMMARY OF THE INVENTION

In one aspect, this invention comprises a process for providing heat to an endothermic reaction inside a reaction passage. The process includes the step of:

(1) separating the endothermic reaction from a combustion site with a nitrogen impervious barrier;

(2) flowing an oxygen containing gas through an air passage along a cathode side of an oxygen-selective ion transport membrane element at a temperature and at an oxygen partial pressure effective to separate oxygen contained within the oxygen-containing gas into a permeate portion that is transferred through the oxygen-selective ion transport membrane element to an anode side and a retentate portion that is retained on the cathode side;

(3) combusting a fuel with at least one of the permeate portion and the retentate portion at the combustion site to form a heat of combustion; and (4) transferring the heat of combustion to the endothermic reaction.

In a preferred embodiment of this aspect, the oxygen-selective ion transport membrane element separates the reaction passage from the air passage. The cathode side of the oxygen selective ion transport membrane element is adjacent to the air passage and the anode side of the membrane is adjacent to the reaction passage. A fuel is injected into the air passage to react with oxygen contained in the retentate and thereby provide the energy required by the process. In another preferred embodiment of this aspect, the reaction passage is separated from a combustion passage by the oxygen-selective ion transport membrane element with the cathode side of the oxygen-selective ion transport membrane being adjacent to the combustion passage and the anode side being adjacent to the reaction passage. A second oxygen-selective ion transport membrane element separates the combustion passage from the air passage. This second oxygen-selective ion transport membrane element is effective for separating the oxygen containing gas into a second oxygen permeate portion that is transferred through the second oxygen-selective ion transport membrane element to a second anode side that is adjacent to the combustion passage and a second retentate portion that is retained on the second cathode side.

A third preferred embodiment is suitable for producing syngas at $H_2/CO$ ratios equal to or greater than 3. In this embodiment, the wall separating the reaction passage from the air passage is an impervious element permitting neither oxygen nor nitrogen to enter the reaction space thereby permitting only the endothermic reforming reaction to take place. The energy for the process is provided by the combustion of fuel with oxygen permeating from the oxygen containing gas on the cathode to the anode of the second ion transport membrane.

In all of the above preferred embodiments, the fuel utilized for combustion preferably has a heating value of less than 500 $BTU/FT^3$ whereby fuel sources typically viewed as waste streams may be utilized. Such fuel sources include flare gases and PSA tail gases.

In a second aspect, the invention comprises a reactor which employs an oxygen transport membrane to supply oxygen to the catalyst laden process side to support a partial oxidation reaction which will supply part of the energy required to sustain the endothermic reforming reaction but which also has provisions for the combustion of fuel in the air passage to generate additional heat. The reactor has a hollow shell that defines an enclosure. A fuel tube extends into the enclosure. This fuel tube has first and second opposing ends. A tubular first oxygen-selective ion transport membrane tube having a tube side and a shell side circumscribes at least a portion of the fuel tube. The shell side of the first oxygen-selective ion transport membrane defines a nitrogen impervious zone within the hollow shell. This first oxygen-selective ion transport membrane element further has a cathode side that is adjacent to the fuel tube and an opposing anode side. A reforming enhancing catalyst is disposed exterior to the first anode side on the shell side. A first fuel source is connected to a first end of the fuel tube and an oxygen-containing gas source is connected to a first end of the tubular first oxygen-selective ion transport membrane element. A process gas source is connected to the shell side of the first oxygen-selective ion transport membrane element.

A preferred embodiment of the second aspect enables the combustion reaction to occur on the anode of a second oxygen transport membrane in the absence of atmospheric nitrogen. In this embodiment, an endothermic reaction isolating tube, which can be the first oxygen ion transport membrane or a nonpermeable barrier, circumscribes at least a portion of a second tubular oxygen-selective ion transport membrane element to define an annulus. This annulus is located between an inside surface of the endothermic reaction isolating tube, or cathode of the first ion transport membrane element, and an outside surface of the second tubular oxygen-selective ion transport membrane element. In most preferred embodiments, this annulus has a width of less than 5 millimeters to enhance convective heat transfer coefficients. If a nonpermeable barrier tube is used it can be made of a metallic or ceramic material. In this embodiment, air fed to the annulus transfers oxygen to the combustion zone inside the second ion transport membrane and optionally also to the process side outside the first ion transport membrane tube to support a partial oxidation reaction. In another preferred embodiment of the second aspect, the second end of the fuel tube is sealed and the fuel tube has a plurality of annular orifices that are effective to deliver the fuel to the first anode side at selected locations.

In a third aspect of the invention, the reforming reaction takes place inside an inner tube which can be an ion transport membrane or a nonpermeable isolating tube, and the combustion reaction occurs shell side or outside a second ion transport membrane, where air for the supply of oxygen flows in the annulus between the two tubes. A reactor is provided that has a hollow shell defining an enclosure. Inside the shell, sets of two concentric ion transport membrane tubes are provided. The annulus defined by the outer diameter of the inner tube and the inside diameter of the outer tube serves as an air passage. Reforming catalyst is disposed within the inner ion transport membrane to define a zone for the reforming reaction.

The tube side of the inner oxygen-selective ion transport membrane element defines a nitrogen impervious zone as does the space between the outer ion transport membrane tube and the shell. A supply of a mixture primarily consisting of methane and steam is connected to a first end of the inner tube, a fuel gas to an inlet on the shell side outside the outer tube and an air supply to a first end of the annulus between the tubes. The second end of the inner tube is connected to product withdrawal means while the second end of the annulus and a shell outlet are connected to waste discharge means. optionally, the discharges from the annulus and the shell side can be combined within the shell space by terminating the outer tube within the shell space.

The tubular oxygen-selective ion transport membrane elements further have an anode side adjacent to the fuel side and process gas side and an opposing cathode side facing the annulus or air passage to enable the transport of oxygen for a partial oxidation reaction on the anode of the inner tube and a combustion reaction on the anode of the outer tube. optionally for generating syngas with high $H_2/CO$ ratios the inner tube can be a nonpermeable barrier.

In yet another preferred embodiment, separate ion transport membrane tubes for the reforming-partial oxidation reaction and for the combustion reaction are disposed within a common shell and isolate the reforming and combustion zones from atmospheric nitrogen. The tubes are attached to opposing tube sheets on the common shell. A first capped ion transport membrane tube circumscribes at least partially a process gas supply or withdrawal tube and has a reforming catalyst disposed in the annulus between the ion transport membrane tube and the supply or withdrawal tube. A combined partial oxidation and reforming reaction takes place in this tube. The outer or cathode surface of the tube faces the shell side. A second ion transport membrane tube is open at one end and closed at the other end and circumscribes a closed end fuel supply tube featuring fuel inlet orifices at desired locations. The cathode of the second ion transport membranes faces the shell side. A combustion reaction takes place inside this second ion transport membrane tube. The shell side is connected to an air supply to provide the oxygen for the partial oxidation and the combustion reactions by ion transport across the respective membrane surfaces. Multiple baffles provide for cross counterflow of air through the shell. Adequate heat transfer from the combustion reaction tube to the reforming tube is provided by radiation and air convection. As in previous embodiments, a nonpermeable barrier tube can replace the first ion transport membrane tube at high $H_2/CO$ ratios.

In any one of the aspects of the invention described above, the tubular oxygen-selective ion transport membrane elements are preferably formed from a mixed conductor metal oxide that is effective for the transport of elemental oxygen at elevated temperatures.

BRIEF DESCRIPTION OF THE DRAWINGS

Other objects, features and advantages will occur to those skilled in the art from the following description of preferred embodiments and accompanying drawings in which:

FIG. 1 illustrates in cross-sectional representation a first method for internally generating heat to sustain an endothermic reaction.

FIG. 2 illustrates in cross-sectional representation an apparatus to deliver fuel to preferred combustion sites.

FIGS. 3–5 illustrate in cross-sectional representation alternative methods for internally generating heat to sustain an endothermic reaction.

DETAILED DESCRIPTION OF THE INVENTION

Figure 4:
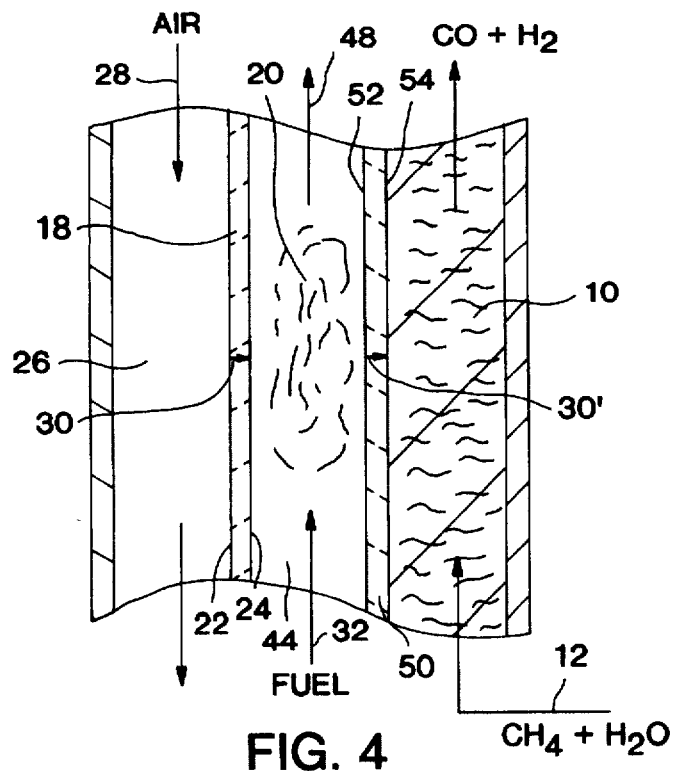

FIG. 1 illustrates in cross-sectional representation a first process for providing heat to an endothermic reaction in accordance with the invention. The endothermic reaction occurs substantially within reaction passage 10. A preferred endothermic reaction is steam reformation. Process gas 12, a mixture of gases that contain the constituents required for steam reformation flow through the reaction passage 10. For the production of syngas, process gas 12 includes methane (or other light hydrocarbons) and steam. Process gas 12 may also contain other reactive constituents such as carbon dioxide as well as inert gases.

To enhance the formation of product gas 14, that is preferably syngas with a hydrogen to carbon monoxide molar ratio exceeding about 2.3 to 2.5, a catalyst bed 16 fills at least a portion of the reaction passage 10. The catalyst may consist of beads or alternatively be disposed on a monolithic substrate or contained in a porous layer attached to a wall of the passage. The catalyst may be uniformly dispersed throughout the reaction passage 10 and have uniform activity or gradationally dispersed and have graded activity to enhance the steam reforming reaction at selected portions of the reaction passage. The catalyst is selected to be effective in enhancing steam reforming of methane to syngas. One such catalyst is nickel, that may be supported on an alumina substrate As a practical constraint, the reactors of the invention include at least one oxygen-selective ion transport membrane element 18. The ion transport membrane element 18 is preferably a mixed conductor metal oxide having an anode on the side facing reaction passage 10 and a cathode on the opposing side. Air flowing in air passage 26 provides oxygen that is transferred by ion transport to the anode side where a partial oxidation reaction takes place.

The heat required to sustain the endothermic reaction is generated in part by a partial oxidation reaction on the anode of the ion transport membrane 18 and in part by the combustion of fuel at combustion site 20. To minimize contamination of the product gas 14 with nitrogen, the combustion site 20 is isolated from the endothermic reaction by a nitrogen impervious barrier. In the embodiment illustrated in FIG. 1, the oxygen-selective ion transport membrane element 18 functions as the nitrogen impervious barrier.

The oxygen-selective ion transport membrane element 18 may be formed as either a dense wall solid oxide mixed or dual phase conductor or, preferably, as a thin film mixed solid oxide or dual phase conductor that is supported on a porous substrate.

Preferably, the membrane film only spans that portion of the reaction passage 10 filled with catalyst 16 with the remaining length of the membrane coated with a metallic or ceramic, gas impervious, seal coat such as nickel or ceria.

When in the form of a monolithic structure, the oxygen-selective ion transport membrane 18 has a nominal thickness of under 5,000 microns and is preferably less than 1,000 microns thick. When a composite, the membrane element typically has a thickness of less than 100 microns and is supported on a porous substrate that is preferably made from a low cost ceramic or nickel-containing, metal alloy. Suitable metal alloys include Inconel 200 and Haynes alloy 230. The support structure may also be formed from a high strength ceramic material such as alumina, ceria or a mixture thereof.

Typically, an intermediate porous layer is disposed between the oxygen-selective ion transport membrane film and the porous substrate to bridge chemical and mechanical incompatibility between the substrate and the membrane. Use of a dense mixed conducting layer on an intermediate porous transition layer over a porous substrate is disclosed, for example, in U.S. Pat. No. 5,240,480 by Thorogood, et al.

The membrane element has the ability to transport oxygen ions and electrons at the prevailing oxygen partial pressure in the temperature range from about 450° C. to about 1200° C. when a chemical potential difference is maintained across the ion transport membrane surface caused by maintaining a positive ratio of oxygen partial pressures across the ion transport membrane. This positive ratio is preferably achieved by reacting transported oxygen with an oxygen consuming process gas. The oxygen ion conductivity is typically in the range of between 0.01 and 100S/CM where S("Siemens") is reciprocal ohms (1/Ω).

Suitable materials for the ion transport membrane include mixed conductive perovskites and dual phase metal-metal oxide combinations as disclosed in U.S. Pat. Nos. 5,702,959 (Mazanec, et al.), U.S. Pat. No. 5,712,220 (Carolan, et al.) and U.S. Pat. No. 5,733,435 (Prasad, et al.), all of which are incorporated herein by reference.

Since the reactive environment on the anode side of the oxygen-selective ion transport membrane element typically creates very low partial oxygen pressures, the chromium containing perovskites listed in the cited patents may be preferred materials since these tend to be stable in the low partial oxygen pressure environment. The chromium containing perovskites are not typically decomposed at very low partial oxygen pressures.

Optionally, a thin porous catalyst layer, possibly made from the same perovskite material, may be added to one or both sides of the oxygen transport membrane element to enhance oxygen surface exchange and the chemical reactions on the surfaces. Alternatively, the surface layers of the oxygen selective ion transport membrane element may be doped, for example, with cobalt, to enhance surface exchange kinetics. The oxygen selective ion transport membrane element 18 has a cathode side 22 and an anode side 24. The oxygen-selective ion transport membrane element 18 may be formed in any desired shape, such as tubes or plates.

The cathode side 22 contacts the air passage 26. An oxygen-containing gas 28 flows through the air passage 26 contacting cathode side 22. The oxygen partial pressures in the air passage 26 and the reaction passage 10 are effective to cause a portion of the oxygen contained within the air 28 to be transported 30 from the cathode side 22 to the anode side 24. Preferably, the oxygen partial pressure on the cathode side 22 is at least a factor of 1,000 greater than the oxygen partial pressure on the anode side 24. More preferably, the oxygen partial pressure differential is on the order of between 1010 and 1015. For example, the oxygen partial pressure on the cathode side may be on the order of 0.1 to 10 atmospheres and on the anode side on the order of 10–14 atmosphere.

A fuel 32 is injected into the air passage 26 and is combusted at combustion site 20 generating heat that is conducted through the oxygen-selective ion transport membrane element to the endothermic reaction. While the fuel 32 may be a high heat value fuel such as natural gas or methane, low heat value fuels provide sufficient heat to sustain the endothermic reaction. Low heat value fuels, typically having a heat value of between 150 and 500 BTU/FT$^3$ include PSA tail gases and refinery flare gases. Since these low heat value gases are typically viewed as waste product streams, the fuel 32 can be provided at a significantly low cost.

The incoming oxygen-containing gas 28, typically air, contains about 21%, by volume, of oxygen at sea level. On contacting the oxygen-selective ion transport membrane element 18 at an effective temperature and oxygen partial pressure, a portion of the oxygen, the permeate portion, is transported through the oxygen-selective ion transport membrane element and a second portion of the oxygen contained in the air reacts with fuel 32. The remainder of the stream, the retentate, containing primarily nitrogen and some residual oxygen, is discharged as oxygen-depleted gas 34. This oxygen-depleted gas typically contains less than 6%, by volume, of oxygen, but effectively supports combustion. Therefore, it is not necessary to provide a separate oxygen source to support combustion at the combustion site 20.

Rather than mixing the fuel 32 with air 28 and risking early and non-uniform combustion, it is preferred to inject the fuel 32 uniformly along the length of the air passage 26 or, in the alternative, in a predetermined fashion to generate heat as required by local energy balances. With reference to FIG. 2, a fuel tube 36 formed from a material having a sufficiently high temperature to withstand the combustion temperature, such as stainless steel or a ceramic, is inserted into the air passage 26. The fuel tube 36 has a first end 38 that is typically open and an opposing second end 40 that is typically closed. Multiple orifices 42 extend through the fuel tube. The fuel 32 enters at the first end 38 and flows through fuel tube 36 exiting through the multiple orifices 42.

The multiple orifices 42 may be uniformly spaced along the length of the fuel tube 36. Preferably, the multiple orifices are disposed in a predetermined fashion to generate heat were most required by local energy balances. Typically, as illustrated in FIG. 2, the greater energy deficit occurs at the end of reaction passage 10 where the process gases 12 are introduced.

A typical syngas producing plant utilizing PSA tail gas as the fuel 32 and a mixture of methane and steam as a process gas will produce sufficient energy to generate syngas with an $H_2/CO$ molar ratio of about 2.7.

FIG. 3 illustrates an alternative process flow for the production of syngas at a $H_2/CO$ molar ratio of 3 or higher. The energy to support the reforming reaction is provided by combustion of the fuel 32 in a combustion passage 44 with oxygen for the combustion supplied by ion transport through ion transport membrane 24. Combustion passage 44 is disposed between the reaction passage 10 and the air passage 26. In this embodiment, the nitrogen impervious barrier 46 between the combustion passage and the reforming passage is formed from a thermally conductive, gas impervious, material such as a metallic or ceramic tube or plate.

The oxygen selective ion transport membrane element 18 is disposed with anode side 24 forming a wall of the combustion passage 44 and cathode side 22 forming a wall of air passage 26. Oxygen containing gas 28, typically air, flows through the air passage 26 contacting cathode side 22 such that a permeate portion of the oxygen contained within the air 28 is transported 30 through the oxygen-selective ion transport membrane element 18 to support combustion at site 20 within combustion passage 44.

The fuel 32 may be a fuel with a low heating value. Unlike in the embodiment illustrated in FIG. 1, the combustion environment does not contain any nitrogen since only oxygen is transported 30 through the oxygen selective ion membrane element. Therefore, combustion products 48 exiting the combustion passage 44 are substantially free of NOx compounds.

The use of an ion transport combustion membrane has the advantage that the reaction is distributed along the length of the passage by local oxygen transport and is relatively independent of local fuel/oxygen ratios in the interior of the combustion passage. Therefore wall temperatures are easier to control within a relatively narrow range. The temperature of the oxygen selective ion transport membrane element is controlled to stay within the operating range of the selected ion transport material, typically from 700° C. to 1100° and, preferably between 800° C. and 1000° by control of the mass flow rate of the air 28 and fuel 32, local oxygen flux, the local reaction kinetics in passage 10, by catalyst activity and fluid composition, and appropriate heat transfer from the membrane surface to the reforming passage by radiation and convection. The heat capacity of the retentate stream can act as a moderator to limit local temperature excursions. Use of distributed fuel injection as in FIG. 2 can lend an additional measure of control.

FIG. 4 illustrates yet another process in accordance with the invention. Air passage 26 is disposed between combustion passage 44 and reaction passage 10. The first oxygen-selective ion transport membrane element 18 separates the air passage 26 from the combustion passage 44 with the cathode side 22 adjacent to the air passage 26 and the anode side 24 adjacent to the combustion passage 44.

A second oxygen selective ion transport membrane element 50 separates the combustion passage 44 from the reaction passage 10 with the second cathode side 52 adjacent to combustion passage 44 and the second anode side 54 adjacent to reaction passage 10.

A first permeate portion of the oxygen contained within oxygen containing gas 28 is transported 30 to combustion passage 44 to support combustion site 20 and to provide oxygen. A second permeate portion of oxygen is transported 30' through the second oxygen selective ion transport membrane element 50 to support a partial oxidation reaction in the reaction passage. The heat required by the endothermic reforming reaction is partially supplied by the partial oxidation reaction and partially by combustion of fuel in combustion passage 44. By proportioning the mass flow rate of the fuel 32 relative to the light hydrocarbon mass flow rate of process gas 12, the $H_2/CO$ molar ratio in product gas 14 is controlled. A high fuel to natural gas ratio favors a high $H_2/CO$ molar ratio because such a configuration depresses the partial oxidation reaction in the reaction passage and promotes reforming.

In this configuration it is also possible to use an impervious barrier in place of the second ion transport membrane 50 and thereby confine the reactions in the reaction passage 10 to steam reforming.

Figure 5:
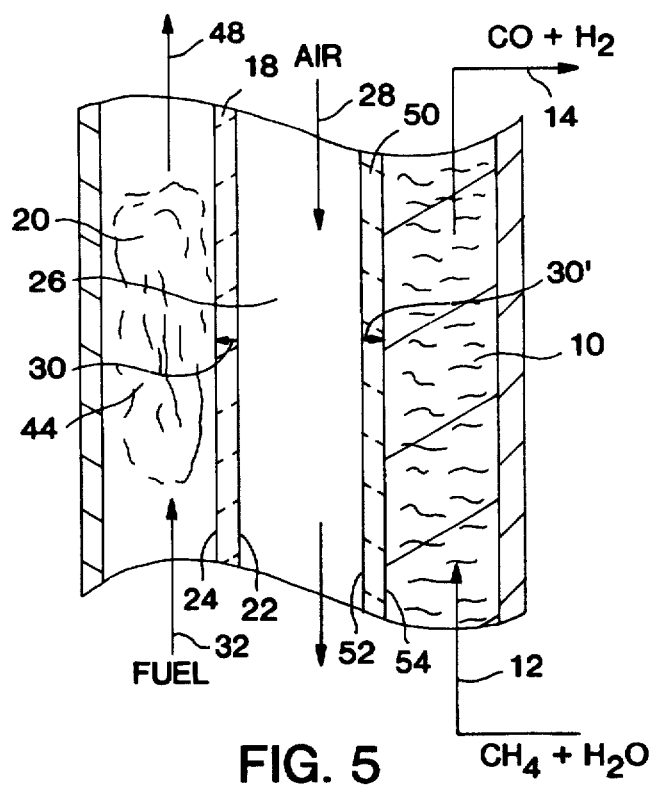

In an embodiment of the invention illustrated in FIG. 5, the first oxygen-selective ion transport membrane element 18 separates the air passage 26 from the combustion passage 44 whereby combustion products 48 are essentially free of NOx.

In this embodiment, the combustion passage 44 is separated from reaction passage 10 by a second oxygen-selective ion transport membrane element 50. The second oxygen-selective ion transport membrane element 50 has a second cathode side 52 that is adjacent to the combustion passage 44 and a second anode side 54 that is adjacent to the reaction passage 10.

Oxygen contained within the oxygen-containing gas 28 is transported 30 through the first oxygen-selective ion transport membrane element to support combustion at the combustion site 20. The quantity of oxygen transferred is in excess of that required for combustion thereby establishing an oxygen partial pressure between that in air passage 26 and that in reaction passage 10. If the partial oxygen pressure in the combustion passage 44 is maintained at a level intermediate to the partial oxygen pressure of the air passage 26 and the partial oxygen pressure of the reaction passage 10, excess oxygen contained within the combustion passage 44 is transported 30' through the second oxygen-selective ion transport membrane element to the reaction passage 10.

The fuel 32 is below stoichiometric requirements (lean) and distributed along the length of the combustion passage 44 to facilitate a uniform oxygen partial pressure throughout the combustion passage. By control of the mass flow rate of the oxygen containing gas 28, the fuel 32 and the process gas 12, the required partial oxygen pressure distribution is achieved. In this embodiment, the heat required by the endothermic reforming reaction is partially provided by the partial oxidation reaction in the reaction passage and partially by the combustion of fuel in combustion passage 44.

While the above process flows illustrate reforming utilizing steam, it is recognized that carbon dioxide may replace either a portion or all of the steam in any one of the above embodiments.

Figure 6:
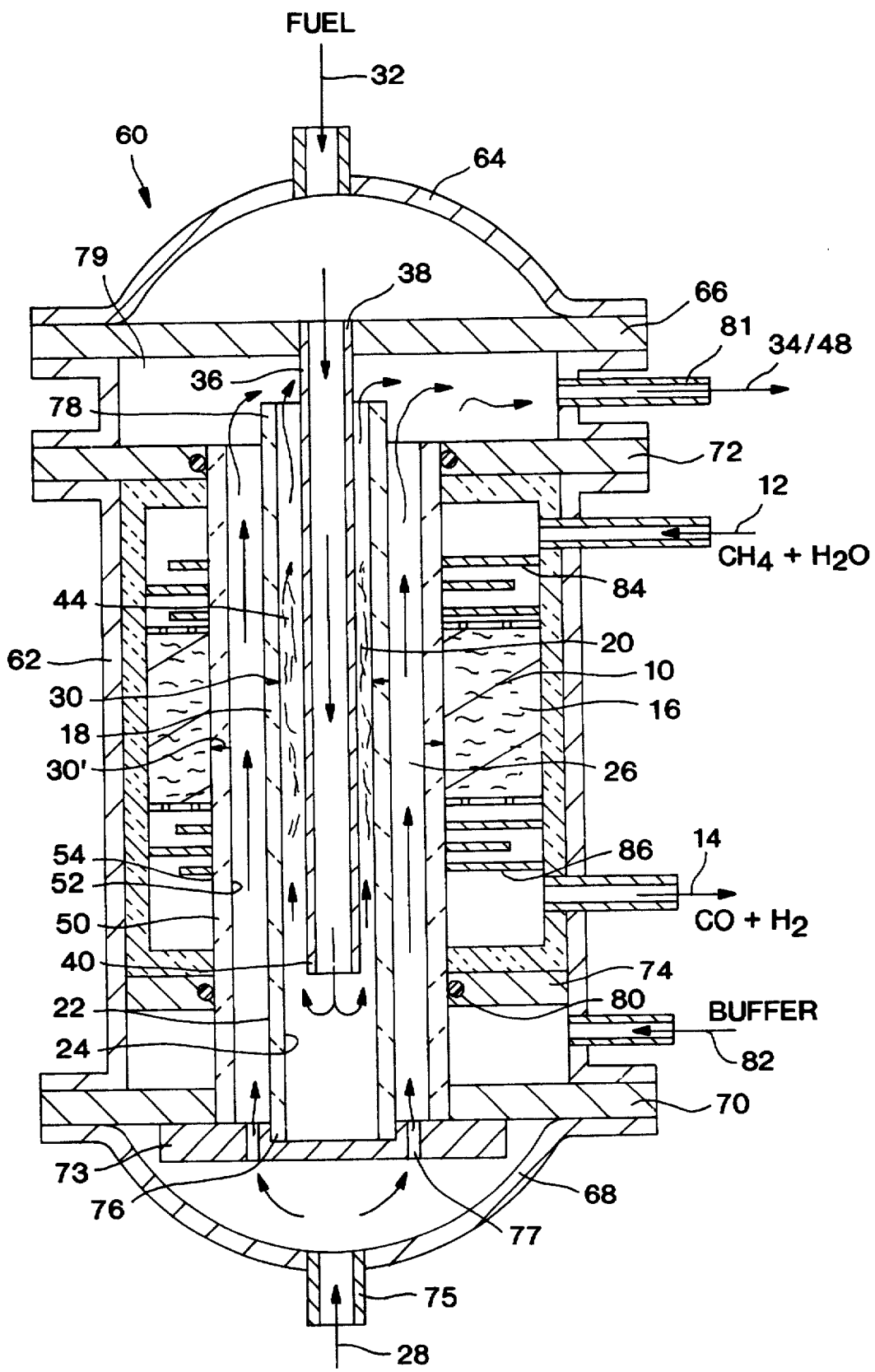
FIGS. 6–8 illustrate reactor designs effective to generate syngas according to the methods of the invention.

FIG. 6 illustrates in cross-sectional representation a reactor 60 particularly suited for the process flow illustrated in FIG. 4. The reactor 60 has a hollow shell 62 defining an enclosure. Fuel tube 36 has a first end 38 and an opposing second end 40. A tubular first oxygen selective ion transport membrane element 18 circumscribes at least a portion of the fuel tube 36. The first oxygen selective ion transport membrane element 18 has an anode side 24 adjacent to the fuel tube 36 and an opposing cathode side 22.

A second ion transport element 50 surrounds ion transport element 18 defining an annulus 26 between cathode sides 22, 52. Exterior to the second anode side 54 is a reforming enhancing catalyst 16 which extends over the length of the center reaction section. A preheat section extends from the process gas entry 12 to the reaction section and a heat recovery or cooling section from the bottom of the reaction section to the product exit 14. The incorporation of preheat and cooling sections in the reactor reduces the temperature at the tube sheets, permitting use of ordinary engineering materials such as carbon and stainless steel and eases making tube to tube sheet joints and seals.

Fuel 32 is introduced to the reactor 60. For example, a combination of reactor top head 64 and first tube sheet 66 could form a manifold to connect the source of the fuel 32 to the first end 38 of fuel tube(s) 36.

A source of oxygen containing gas 28, such as air, provides an air flow along cathode sides 22 and 52. The combination of the reactor bottom head 68 and a second tube sheet 70 define a manifold to connect the source of the oxygen-containing gas 28 to the air passage 26 which is bounded by the cathodes 22 and 52 of the first oxygen selective ion transport membrane element 18 and the second oxygen selective ion transport membrane 50, respectively.

Process gases 12 are delivered to the reactor 60 on the shell side, or outside of the second oxygen selective ion transport membrane element 50. Process gases 12 are preheated against hot oxygen depleted air in the preheat section and then enter the reaction zone where they react with oxygen being transported 30' across second ion transport membrane 50 from air passage 26 in a partial oxidation reaction and with each other in a reforming reaction to produce syngas of the required $H_2/CO$ ratio. The resulting product is cooled against incoming air and leaves the reactor as product gas 14.

The heat for the endothermic steam reforming reaction is partially supplied by the exothermic partial oxidation reaction and partially by the reaction of fuel, introduced via process gas 12 and fuel feed tube 38, with oxygen permeating by ion transport across ion transport membrane 50 within combustion passage 44. Heat released by the combustion of fuel in combustion passage 44 is transferred by radiation and convection to the reaction passage 10. The configuration consisting of concentric tubes is favorable for radiation heat transfer. High convective coefficients can be achieved by small annulus width and/or high gas velocities.

Since ion transport tube 50 is impermeable to nitrogen, the combination of third tube sheet 72, second tube sheet 70 and bottom cover 73 forms a nitrogen impervious barrier. Atmospheric nitrogen is excluded from the combustion passage 44 and the formation of nitrous oxides minimized. Since the combustion passage 44 and the reaction passage 10 are independent of each other, a low value fuel can be employed in the combustion passage 44.

The composition of the product gas 14 is controlled by controlling the composition and mass flow rate of process gas 12 and the mass flow rate and concentration of fuel 32. To promote complete combustion it is preferable to keep the fuel/oxygen ratio in combustion passage 44 on the lean side. As described previously, optionally the second end 40 of the fuel tube 36 can be capped and fuel introduced through a plurality of orifices in the wall of the fuel tube to better control combustion site 20.

Air for the supply of oxygen to both the partial oxidation and the combustion reactions is introduced into air passage 26 through connection 75 and orifices 77. Products of combustion from combustion passage 44 and oxygen depleted retentate from air passage 26 discharge into common space 79 from where they leave the reactor through connection 81.

To permit unrestrained changes in length of the fuel tube 36 and first 18 and second 50 oxygen selective ion transport membrane element tubes caused by thermal and compositional changes, a combination of fixed and sliding seals are employed. The use of fixed and sliding seals in a shell reactor is described in more detail in U.S. patent application Ser. No. 09/089,372. Fuel tube 36 is restrained at first end 38 by being fixedly bonded to the first tube sheet 66. The opposing second end 40 is free-standing and compensates for axial changes in dimension.

The first oxygen selective ion transport membrane element 18 has a first end 76 fixedly bonded to the second tube sheet 70 and a second end 78 that is free-standing to compensate for axial changes in dimensions.

Second ion transport membrane tube 50 is fixedly attached to bottom cover 73 and sliding seals 80 located on the third tube sheet 72 and fourth tube sheet 74 slidably support the second oxygen selective ion transport membrane element 50 to permit unrestrained axial changes in dimension. To reduce the service severity for sliding seals 80 and to enhance safety, a buffer gas 82, such as steam may be introduced between the sliding seals and fourth tube sheet 74. A buffer gas provision is only illustrated at the bottom seal. If desired, a similar buffer gas provision is added at the top sliding seal with the addition of a tube sheet and shell connection. The buffer gas is delivered at a pressure that is slightly greater than the pressure of either the process gas 12 or the product gas 14 so that should sliding seals 80 leak, steam, a constituent of the steam reforming reaction will flow into the reactor enclosure. As a result, the requirements for the quality of the sliding seals can be relaxed substantially and leakage of reactive gases into oxygen containing spaces avoided.

Process side gases traverse the reactor in cross-counterflow guided by cross baffles 84 in the preheat and cooling sections and, optionally, also in the reaction section to achieve high heat transfer coefficients and, if employed in the reaction section, to compensate for flow maldistribution and nonuniform reaction kinetics.

If it is desired to produce syngas with $H_2/CO$ molar ratios of 3 or greater, second ion transport membrane tube 50 can, optionally, be replaced by an impervious barrier tube made from a metal or ceramic. In this embodiment, all the heat for the reforming reaction is supplied by the combustion of fuel.

Air passage 26 can function as a thermal insulator between combustion site 20 and reaction passage 10. To counter this effect by achieving a high air velocity and high convective heat transfer coefficient, the width of the air passage 26 should be small, preferably less than 5 mm and more preferably in a range of from about 1 to 3 mm. This is especially important in the pure reformer embodiments where more heat has to be transferred from the combustion site to the reforming reaction. Alternatively, the combustion passage and the air passage can be interchanged so that the combustion passage is located adjacent to the reforming passage. This alternative improves heat transfer in the reaction zone, but impedes heat transfer in the preheat and cooling zones.

Figure 7:
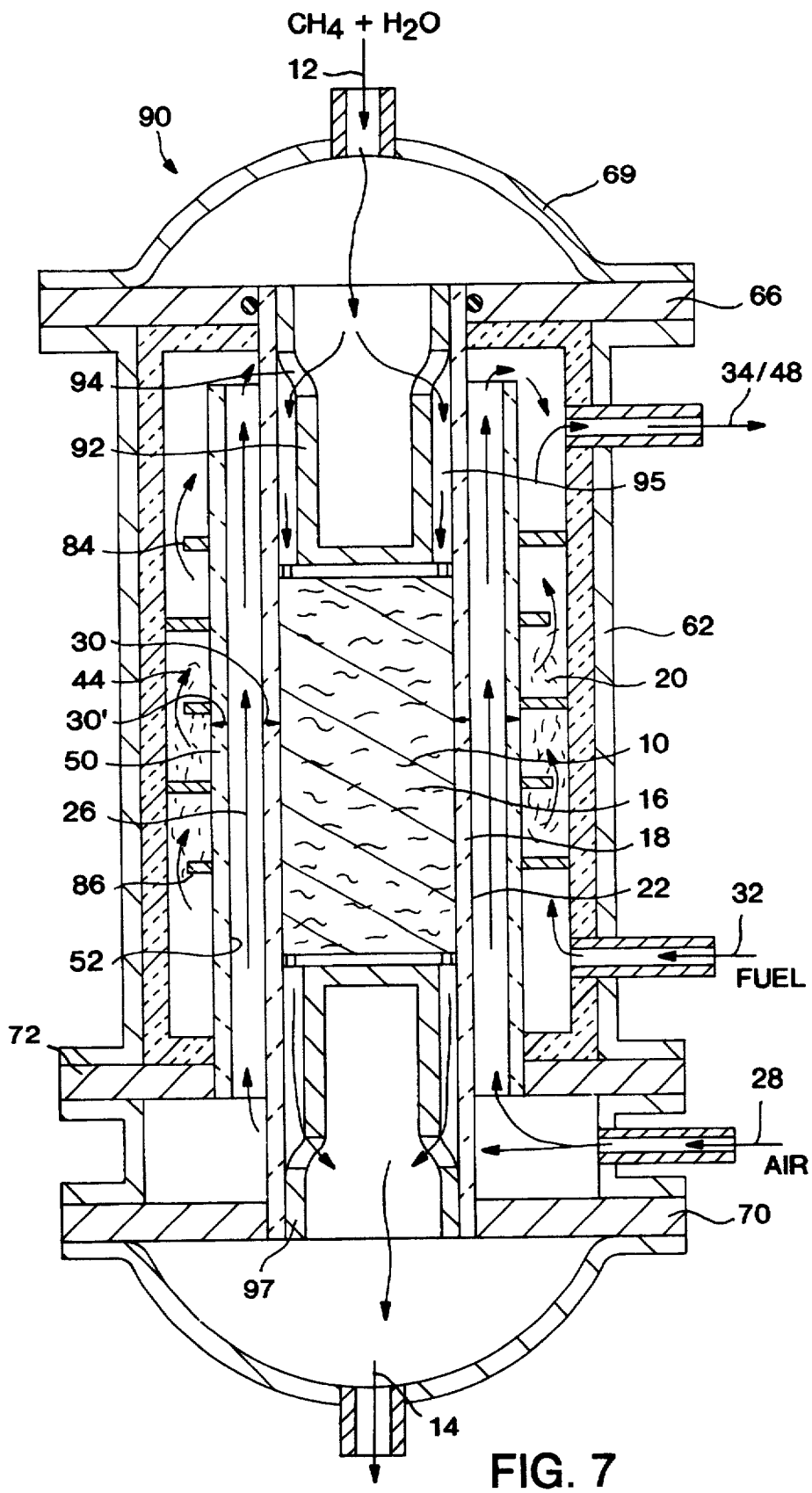

FIG. 7 illustrates in cross-sectional representation a reactor 90 in which the reforming (reaction) passage 10 with catalyst 16 is disposed within the first tubular oxygen selective ion transport membrane element 18. The first oxygen selective ion transport membrane 18 together with first and second tube sheets 66,70 defines a nitrogen impervious barrier for the reaction zone. Second ion transport membrane tube 50 surrounds ion transport membrane tube 18 and defines an air passage 26 annulus bounded by the cathode sides 22,52 of the two ion transport membranes 18,50. A combustion passage 44 is disposed shell side and outside the second oxygen selective ion transport membrane element 50 and may contain baffles 86 to enhance heat transfer and to compensate for flow maldistribution and nonuniform heating effects. As disclosed above, the reactor contains a reaction section, a preheat section and a cooling section.

An oxygen-containing gas 28, typically air, is introduced to air passage 26. A first permeate portion of the oxygen contained within the air 28 is transported 30 to the reaction passage 10 for a partial oxidation reaction. A second permeate portion is transported 30' to combustion passage 44. A fuel 32 is also delivered to the combustion passage 44 and reacted with the permeate oxygen at combustion site 20 generating the required supplementary heat for the endothermic reaction occurring in reaction passage 10.

Process gas 12 is introduced to the reactor 90 and is connected to process gas tube 92. The connection may be by a manifold formed by the combination of reactor top head 64 and first tube sheet 66. The process gas is introduced through multiple orifices 94 in the process gas tube 92 which is flared at the entrance end and sealed to tube sheet 66. The process gas tube 92 extends to the reaction section and forms a narrow flow annulus 95 between its outside diameter and the inside diameter of ion transport tube 18 to enhance heat transfer coefficients in the preheat section on the process gas side. A similar arrangement is used for the cooling section and discharge from the bottom end of tube 18. Process gas tube 92 and its discharge counterpart 97 are preferably formed from metal.

The first oxygen selective ion transport membrane element 18 is fixedly joined at one end, such as to second tube sheet 70 and is slidably attached to opposing first tube sheet 66 to permit unrestrained axial expansion resulting from thermal and compositional changes. The second oxygen selective ion transport membrane element 50 is fixedly joined at one end, such as to the third tube sheet 72 and is unrestrained at the opposing end to allow unrestrained axial expansion from changes in the axial length due to temperature and compositional variation.

As with earlier embodiments, staged and steam buffered sliding seals may be employed.

If a pure reformer is preferred for the reactor 90 design, the first oxygen selective ion transport membrane element 18 may be replaced with a metallic or ceramic tube that does not transport oxygen ions.

Figure 8:
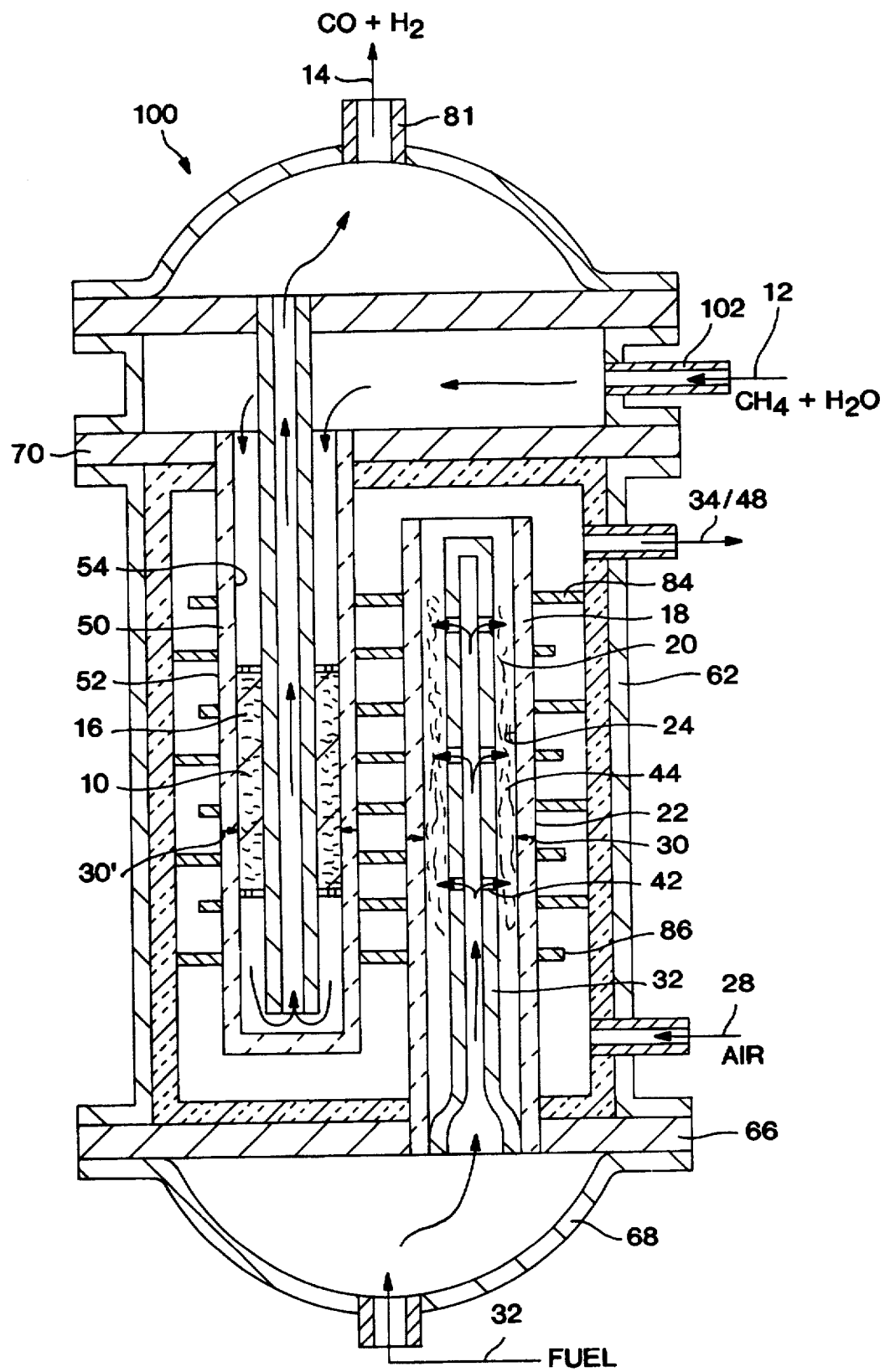

FIG. 8 illustrates a reactor 100 having reaction passage 10 and combustion passage 44 located in separate tubes within the reactor 100 enclosure. Combustion is supported by fuel 32 that is connected to fuel tube 36 such as by a manifold defined by reactor bottom head 68 and first tube sheet 66. The fuel 32 is delivered to the combustion passage 44 through orifices 42, or alternatively, through an open second end of the fuel tube as described above.

Fuel tube 36 defines one surface of the combustion passage 44. The opposing surface is defined by the anode side 24 of a first oxygen selective ion transport membrane element 18. An oxygen-containing gas 28, typically air, flows shell side along the cathode side 22 of the oxygen selective ion transport membrane element. A portion of the contained oxygen is transported 30 through the oxygen selective ion transport membrane and this permeate oxygen portion combines with the fuel 32 at combustion site 20 generating the heat supporting steam reforming in reaction passage 10.

Separated from the combustion reaction, the reforming reaction occurs by the delivery of process gas 12 to the catalyst laden reaction passage 10, formed by the annulus between product withdrawal tube 81 and ion transport membrane tube 50, where, in the presence of catalyst 16, the process gas is converted to product gas 14, typically syngas. A nitrogen impervious barrier separates the reaction passage 10 from the oxygen containing gas 28 flowing within the reactor 100 enclosure. If a partial oxidation reaction is to be supported in the reaction passage 10, then the nitrogen impervious barrier constitutes a second oxygen selective oxygen selective ion transport membrane element 50 having a second cathode side 52 in contact with the flowing oxygen containing gas 28 such that a portion of the oxygen contained within the oxygen containing gas 28 is transported 30' to the second anode side 54. If pure steam reformation is desired, the nitrogen impervious barrier is formed from a metal or a ceramic that does not transport oxygen ions.

Air traverses the shell side in cross-counterflow. The reactor 100 may include cross flow baffles 84 to guide the flow, generate high velocities, enhance heat transfer and compensate for flow maldistribution and nonuniform reactions between individual tubes. The heat from the combustion reaction of fuel is transferred to the reaction passage by radiation and convective heat transfer.

The first oxygen selective ion transport membrane 18 is fixedly attached at one end to first tube sheet 66 with the opposing second end of the oxygen selective ion transport membrane element 18 free-floating. Likewise, the second oxygen selective ion transport membrane element 50 is fixedly attached at a first end to the second tube sheet 70 and has a free-floating opposing second end. This reactor design permits unrestrained axial changes in dimension without requiring any sliding seals.

The seal between the first tube sheet 66 and the first oxygen selective ion transport membrane element 18 must withstand only a relatively small pressure difference and may be readily fashioned by conventional means, such as a metallic braze between a metal tube sheet and a metallized tube end. The seal between the second tube sheet 70 and the second oxygen selective ion transport membrane element 50 must withstand a significantly higher pressure difference. While a conventional seal could be sufficient, it is within the scope of the invention to stage the seal by the introduction of a buffer gas between the process gas 12 inlet 102 and the seal. As a result, any leakage into the hollow shell around the seal will be buffer gas, such as steam, rather than hydrocarbons.

Figure 9:
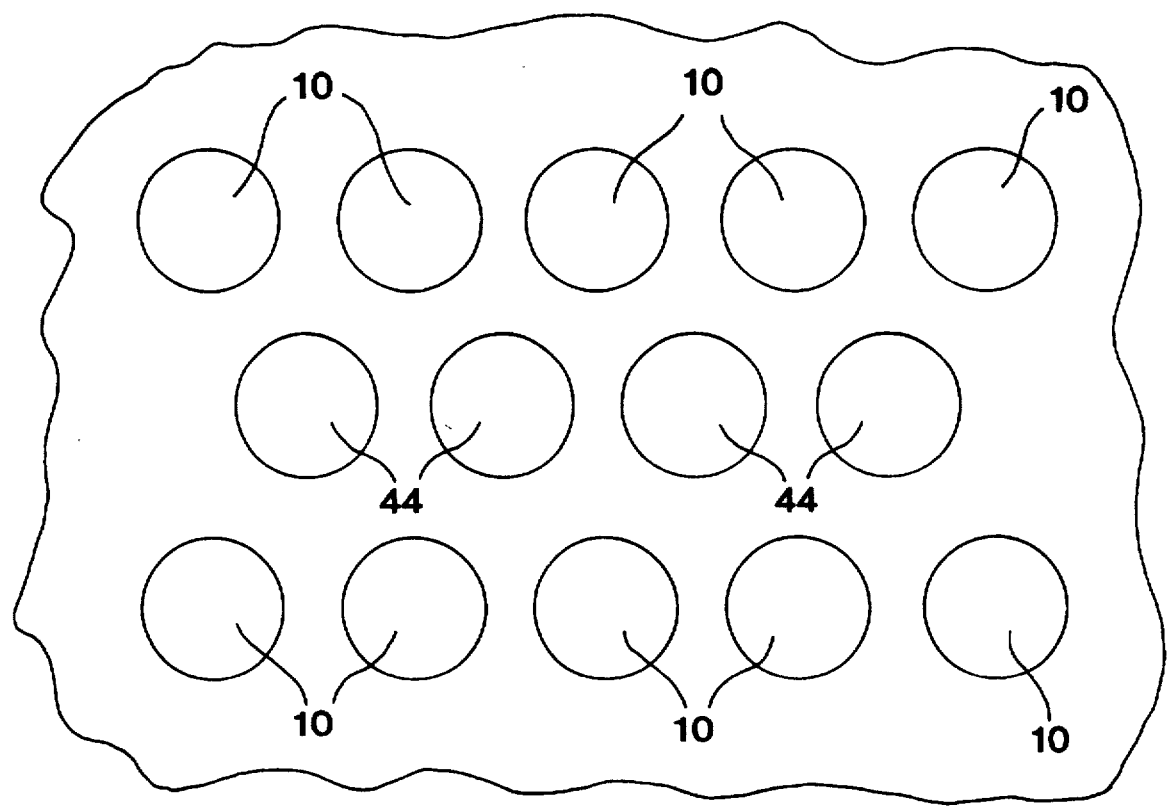
FIG. 9 illustrates an orientation pattern for a plurality of heat generating combustion tubes and heat requiring reformer tubes for use in the reactors of the invention.

While FIG. 8 illustrates a single pair of tubes, a typical reactor will contain multiple tubes which are spaced and loosely supported by densely spaced cross baffles to provide for efficient heat transfer. FIG. 9 schematically illustrates a portion of an exemplary tube bundle having rows of tubes containing a reaction passage 10 alternating with rows of tubes containing a combustion passage 44. Of course any other suitable tube configuration is also amenable to the reactors of the invention.

What is claimed is:

1. A process for providing heat to an endothermic reforming reaction inside a reaction passage, comprising:

flowing an oxygen containing gas through an air passage along a cathode side of an oxygen selective ion transport membrane element to separate oxygen contained within said oxygen containing gas into a permeate portion that is transported through said oxygen selective ion transport membrane element to an anode side and a retentate portion that is retained on said cathode side;

the reaction passage being separated from the air passage by said oxygen selective ion transport membrane element;

combusting a fuel with said retentate portion, thereby generating a heat of combustion;

exothermically reacting part of a constituent of a process gas flowing through said reaction passage with the permeate portion, thereby generating further heat of combustion; and transferring said heat of combustion and said further heat of combustion to said endothermic reforming reaction.

2. The process of claim 1 including injecting said fuel into said air passage through multiple orifices.

3. A process for providing heat to an endothermic reforming reaction inside a reaction passage, comprising:

flowing an oxygen containing gas through an air passage along a cathode side of an oxygen selective ion transport membrane element to separate oxygen contained within said oxygen containing gas into a permeate portion that is transported through said oxygen selective ion transport membrane element to an anode side and a retentate portion that is retained on said cathode side;

the reaction passage being separated from said air passage by said oxygen selective ion transport membrane element;

a second oxygen selective ion transport membrane element separating said air passage from a combustion passage, said second oxygen selective ion transport membrane element being effective to separate oxygen contained within said oxygen containing gas into a second permeate portion that is transported through said second oxygen selective ion transport membrane element to a second anode side that is adjacent to said combustion passage and a second retentate portion that is retained on said second cathode side;

combusting a fuel with said second permeate portion, thereby generating a heat of combustion;

exothermically reacting part of a constituent of a process gas flowing through said reaction passage with the permeate portion, thereby generating further heat of combustion; and transferring said heat of combustion and said further heat of combustion to said endothermic reforming reaction.

4. A process for providing heat to an endothermic reforming reaction inside a reaction passage, comprising:

transporting a permeate portion of oxygen through an oxygen selective ion transport membrane element from a cathode side thereof located within a combustion passage to an anode side located within said reaction passage so that a retentate portion is retained on said cathode side;

flowing an oxygen containing gas through an air passage separated from said combustion passage by a second oxygen selective ion transport membrane element, said second oxygen selective ion transport membrane element being effective to separate oxygen contained within said oxygen containing gas into a second permeate portion that is transported through said second oxygen selective ion transport membrane element to a second anode side that is adjacent to said combustion passage, thereby to produce the oxygen within the combustion passage forming the permeate portion of the oxygen, and a second retentate portion that is retained on said second cathode side;

combusting a fuel within the combustion passage with the oxygen of the second permeate portion, thereby generating a heat of combustion;

exothermically reacting part of a constituent of a process gas flowing through said reaction passage with the permeate portion, thereby generating further heat of combustion; and transferring said heat of combustion and said further heat of combustion to said endothermic reforming reaction.

5. A process for providing heat to an endothermic reforming reaction inside a reaction passage comprising:

flowing an oxygen containing gas through an air passage along a cathode side of an oxygen selective ion transport membrane element to separate oxygen contained within said oxygen containing gas into a permeate portion that is transported through said oxygen selective ion transport membrane element to an anode side and a retentate portion that is retained on said cathode side;

said air passage being separated from a combustion passage by said oxygen selective ion transport membrane element and said combustion passage being separated from said reaction passage by a gas impervious barrier;

combusting a fuel within said combustion passage with said permeate portion, thereby generating a heat of combustion; and transferring said heat of combustion to said endothermic reforming reaction.

6. The process of claim 1 or claim 3 or claim 4 or claim 5 including selecting said fuel to have a heating value of less than 500 BTU/FT$^3$ and said process gas to include a constituent with a heating value in excess of 900 BTU/FT$^3$.

7. The process of claim 6 wherein steam is included as a constituent of said process gas for endothermic steam reformation.

8. The process of claim 6 including the addition of carbon dioxide to said process gas.

* * * * *